(12) United States Patent
Ealey

(10) Patent No.: US 9,345,970 B2
(45) Date of Patent: *May 24, 2016

(54) SWITCHING OPERATION OF AN ENTERTAINMENT DEVICE AND METHOD THEREOF

(71) Applicant: Sony Computer Entertainment Europe Limited, London (GB)

(72) Inventor: Douglas R. Ealey, Southampton (GB)

(73) Assignee: Sony Computer Entertainment Europe Limited (GB)

(*) Notice: Subject to any disclaimer, the term of this patent is extended or adjusted under 35 U.S.C. 154(b) by 90 days.

This patent is subject to a terminal disclaimer.

(21) Appl. No.: 14/174,148

(22) Filed: Feb. 6, 2014

(65) Prior Publication Data

US 2014/0155166 A1 Jun. 5, 2014

Related U.S. Application Data

(60) Continuation of application No. 13/361,254, filed on Jan. 30, 2012, now Pat. No. 8,678,922, which is a (Continued)

(30) Foreign Application Priority Data

Mar. 1, 2007 (GB) .................................. 0703974.6
Mar. 5, 2007 (GB) .................................. 0704246.8

(51) Int. Cl.
*A63F 13/30* (2014.01)
*A63F 13/31* (2014.01)
*A63F 13/00* (2014.01)

(52) U.S. Cl.
CPC ............... *A63F 13/30* (2014.09); *A63F 13/005* (2013.01); *A63F 13/12* (2013.01); *A63F 13/31* (2014.09);

(Continued)

(58) Field of Classification Search
CPC . A63F 13/005; A63F 13/12; A63F 2300/408; A63F 2300/807; A63F 2300/8082; A63F 2300/50; A63F 13/30; A63F 13/31; A63F 13/34

See application file for complete search history.

(56) References Cited

U.S. PATENT DOCUMENTS 5,884,029 A * 3/1999 Brush, II .................. G06F 3/011
                                                        709/202
6,070,149 A    5/2000 Tavor et al.
(Continued)

FOREIGN PATENT DOCUMENTS

EP    1669114 A2    6/2006
EP    2131933 A1    12/2009
(Continued)

OTHER PUBLICATIONS

Office Action from GB Application No. 0704246.8 dated Jul. 15, 2011.

(Continued)

*Primary Examiner* — Pierre Eddy Elisca
*Assistant Examiner* — David Duffy
(74) *Attorney, Agent, or Firm* — Lerner, David, Littenberg, Krumholz & Mentlik, LLP

(57) ABSTRACT

A server for administering an on-line virtual environment comprises a data communication arrangement and a processor. The data communication arrangement receives a signal from a first entertainment device in communication with an instance of the virtual environment. The signal indicates that a user of that device has performed a predetermined action. The processor determines the availability of a second entertainment device, and is operable to switch the second device from a second instance of the virtual environment to the first instance of the virtual environment. The data communication arrangement is operable, if the second device is available, to transmit a signal to the first device indicating that a software controlled avatar within that instance should change modes to represent a user of the second device. The processor is operable to transfer control of a previously software controlled avatar within that instance of the virtual environment to the second device.

11 Claims, 16 Drawing Sheets

Related U.S. Application Data division of application No. 12/524,026, filed as application No. PCT/GB2008/000681 on Feb. 29, 2008.

(60) Provisional application No. 60/892,397, filed on Mar. 1, 2007.

(52) U.S. Cl.
CPC ....... *A63F 2300/408* (2013.01); *A63F 2300/50* (2013.01); *A63F 2300/807* (2013.01); *A63F 2300/8082* (2013.01); *C04B 2237/366* (2013.01)

(56) References Cited

U.S. PATENT DOCUMENTS

| | | | |
|---|---|---|---|
| 6,767,287 | B1 | 7/2004 | Mcquaid et al. |
| 6,928,417 | B1 | 8/2005 | Sundaresan |
| 6,951,516 | B1 | 10/2005 | Eguchi et al. |
| 7,387,571 | B2 | 6/2008 | Walker et al. |
| 7,559,834 | B1* | 7/2009 | York ............... A63F 13/10 463/2 |
| 7,887,418 | B2* | 2/2011 | Kaminagayoshi ...... A63F 13/10 463/1 |
| 8,556,723 | B2* | 10/2013 | Jung ............... G06Q 30/06 380/251 |
| 2002/0126133 | A1 | 9/2002 | Ewins |
| 2002/0137557 | A1 | 9/2002 | Ishii et al. |
| 2003/0069069 | A1 | 4/2003 | Kinjo et al. |
| 2004/0266537 | A1 | 12/2004 | Morris |
| 2005/0227766 | A1* | 10/2005 | Kaminagayoshi ...... A63F 13/10 463/42 |
| 2008/0026838 | A1 | 1/2008 | Dunstan et al. |
| 2008/0059304 | A1* | 3/2008 | Kimsey ............. A63F 13/12 705/14.12 |
| 2008/0139306 | A1 | 6/2008 | Lutnick et al. |
| 2010/0029361 | A1 | 2/2010 | Anderson et al. |
| 2010/0304806 | A1 | 12/2010 | Coleman et al. |

FOREIGN PATENT DOCUMENTS

| | | |
|---|---|---|
| JP | 07178244 A | 7/1995 |
| JP | 2000057374 A | 2/2000 |
| JP | 2001034787 A | 2/2001 |
| JP | 2001079274 A | 3/2001 |
| JP | 2001252467 A | 9/2001 |
| JP | 2002055935 A | 2/2002 |
| JP | 2002117254 A | 4/2002 |
| JP | 2002239251 A | 8/2002 |
| JP | 2003030469 A | 1/2003 |
| JP | 2004078238 A | 3/2004 |
| JP | 2004221855 A | 8/2004 |
| JP | 2006158955 A | 6/2006 |
| JP | 2006158956 A | 6/2006 |
| WO | 0070557 A2 | 11/2000 |
| WO | 2006126205 A2 | 11/2006 |
| WO | 2008/104784 A1 | 9/2008 |

OTHER PUBLICATIONS

Japanese Office Action for JP 2009-551938 dated May 1, 2012.
Arawen Silverstar; Head, OM-Friendly Initiative; DM, Neverwinter Connections; "So You Want to be a Dungeon Master?"; three sheets; Retrieved from the Internet: <http://nwn.bioware.com/dms/profile_dmhowto.html>.
Combined Search and Examination Report under Sections 17 and 18(3) dated Aug. 1, 2007 corresponding to GB0704246.8.
Combined Search and Examination Report under Sections 17 and 18(3) from GB0704235.1 dated Jul. 6, 2007.
Game Master—WoWWiki—Your guide to the World of Warcraft; "Game Master"; Retrieved from the Internet: <http://www.wowwiki.com/index.php?title=Game_Master&oldid=1649691>; p. 1-2; dated Jun. 24, 2009.
International Preliminary Report on Patentability (Chapter II of the Patent Cooperation Treaty) dated Jun. 18, 2009 from PCT/GB2008/000682.
International Preliminary Report on Patentability dated Jun. 18, 2009 from corresponding PCT/GB2008/000681.
International Search Report and Written Opinion dated Jun. 18, 2008 from the corresponding PCT/GB2008/000681.
International Search Report and Written Opinion dated Jun. 6, 2008 from the corresponding PCT/GB2008/000682.
Japanese Office Action for 2009-551989 dated Feb. 21, 2012.
Linden Research et al: "Second Life" 19000101, Apr. 24, 2008, XP002478210, the whole document.
Richard A. Bartle: "Designing Virtual Worlds" 19000101, Jan. 1, 1900, XP002478211; p. 17-p. 31.
Tychsen, Hitchens, Brolund, Kavalki: "The Game Master" [Online]; Mar. 2005, Playing Stories, Interactive Gaming Conference Sydney, XP002482977 ISBN: 0-9751533-2-2; Retrieved from the Internet: <http://www.ics.mq.edu.au/{atychsen/reports/texts/p215-tychsen.pdf> [retrieved on May 30, 2008]; p. 218, col. 2, line 29-line 38, p. 222, col. 1, line 13-line 19.
Wikipedia: "Nobilis" [Online]1999, Wikipedia, www.wikipedia.org, XP002482979; Retrieved from the Internet: <http://en.wikipedia.org/wiki!Nobilis> [retrieved on Jun. 2, 2008]; the whole document.
Wikipedia: "Nobilis", Wikipedia, Www.Wikipedia.Org, Retrieved from the Internet: <http://en.wikipedia.org/ w/index.php?title=Nobilis&oldid=247108090>, pp. 1-4; dated Jun. 24, 2009.
Wikipedia: "Non-Player Character" [Online] Apr. 25, 2008, Wikipedia, www.wikipedia.org, XP002482978 Retrieved from the Internet: <http://en.wikipedia.org/wiki/Non-player_character> [retrieved on May 30, 2008]; p. 1, paragraph 4.
www.apple.com: Neverwinter Nights game information "Dice to Clicks" [Online] Jul. 2003, vwvin.apple. com, www.apple.com, XP002482980 Retrieved from the Internet: <http://www.apple.com/games/articles/2003/07/neverwinternights> [retrieved on May 30, 2008] p. 2, col. 1, paragraph 5.
Www.Gamefaqs.Com: "Neverwinter Nights release date information (Mac version)" [online] 1999, www.gamefaqs.com, www.gamefaqs.com, XP002482981; Retreived from the Internet: <http://www.gamefaqs.com/computer/mac/data/935059.hzml> [retrieved on May 30, 2008]; p. 1.

\* cited by examiner

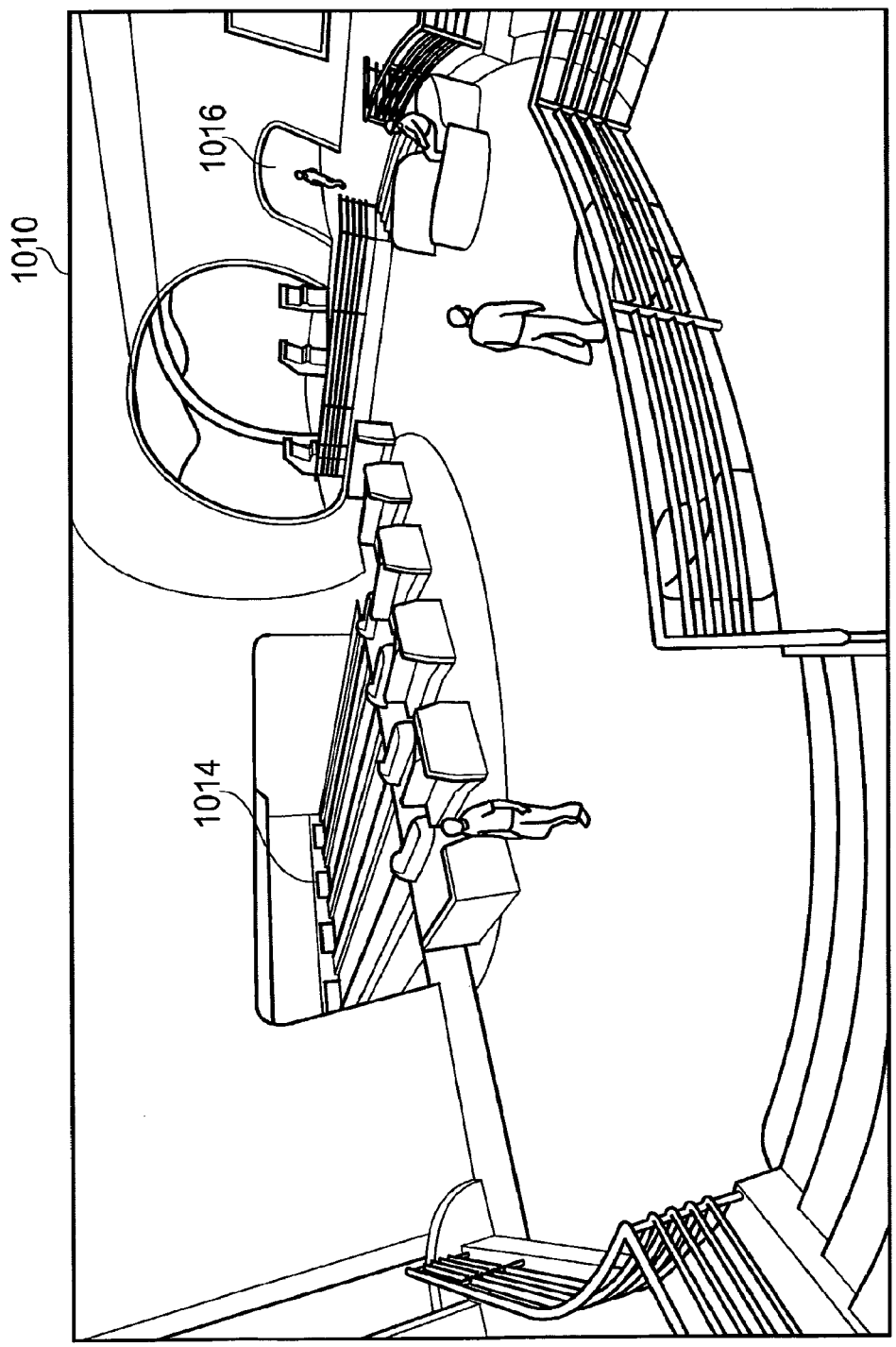

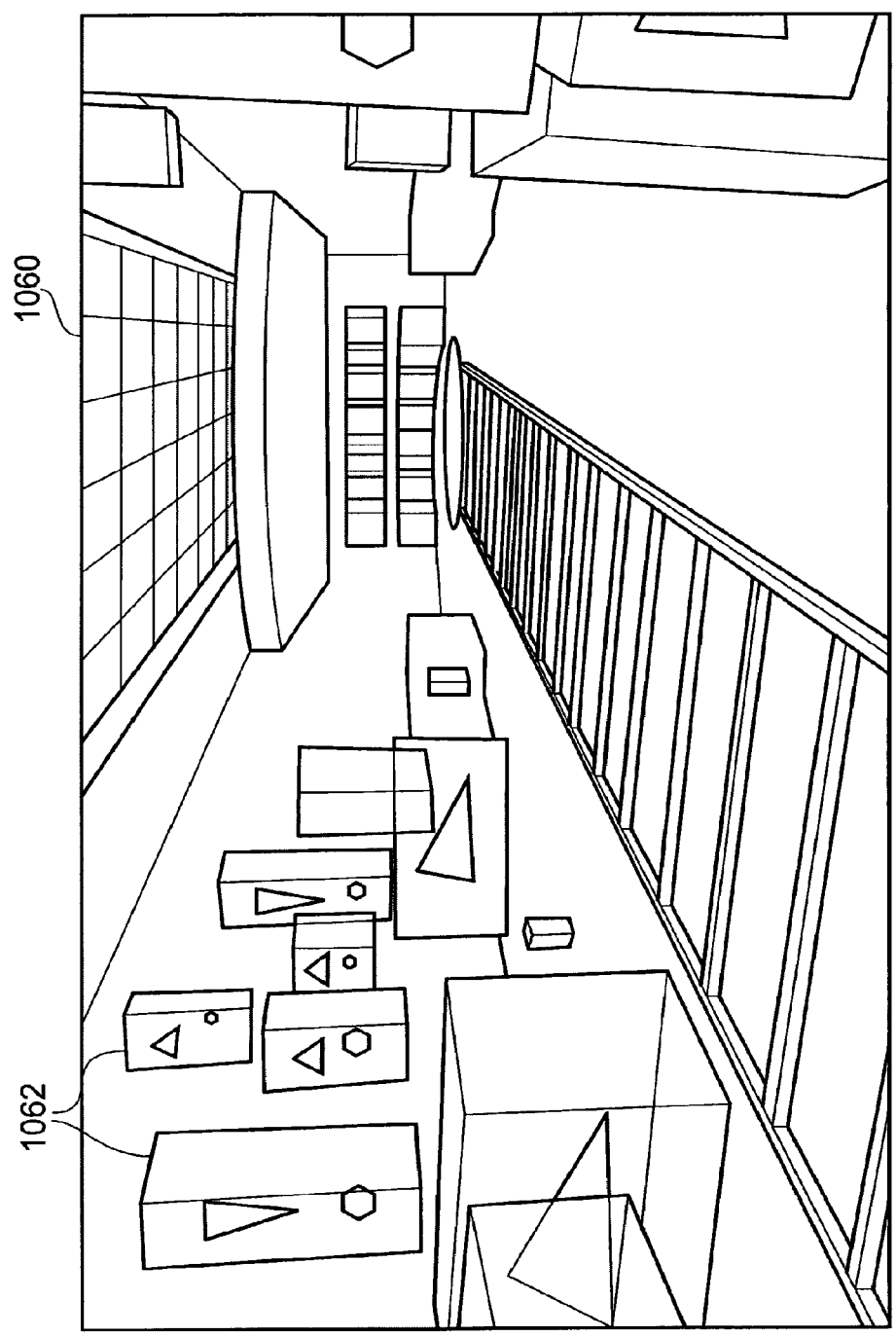

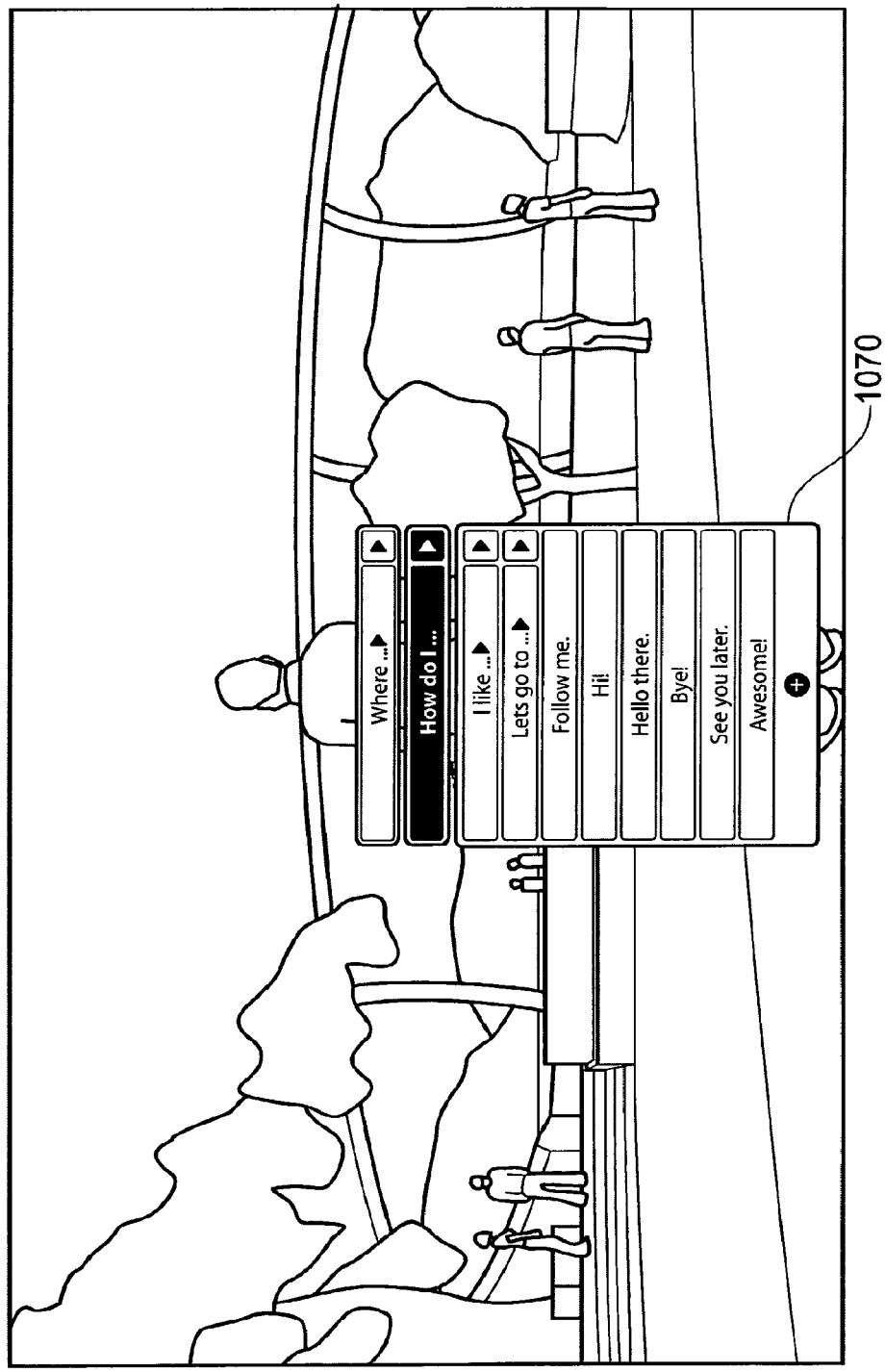

SWITCHING OPERATION OF AN ENTERTAINMENT DEVICE AND METHOD THEREOF

CROSS-REFERENCE TO RELATED APPLICATIONS

The present application is a continuation of U.S. patent application Ser. No. 13/361,254, filed on Jan. 30, 2012, now U.S. Pat. No. 8,678,922, which is a divisional of U.S. patent application Ser. No. 12/524,026, filed on Jul. 30, 2009, which application is a national phase entry under 35 U.S.C. §371 of International Application No. PCT/GB2008/000681 filed in English on Feb. 29, 2008, which claims priority to U.S. Provisional Application No. 60/892,397 filed Mar. 1, 2007, to U.K. Application No. GB 0703974.6 filed Mar. 1, 2007, and to U.K. Application No. GB 0704246.8 filed Mar. 5, 2007, the entire disclosures of which are hereby incorporated herein by reference.

BACKGROUND OF THE INVENTION

This invention relates to entertainment devices and methods.

In shops, sports events and for other organised social gatherings, in general one or more representatives of the shop or the organising entity are available in person, thereby allowing an attendee to ask for help, make a purchase or alert someone to a problem.

In a similar fashion, in the fields of on-line social networks such as MySpace® or Bebo®, or online commercial retailing, such as Amazon® or Ebay®, users interact with the organising entity via a web interface. This interface is either made available at the root of the entity's web address or is imposed upon each web page in the form of a titlebar or sidebar comprising links to relevant pages, such as 'frequently asked questions' or a site map. However, such an approach is both impersonal and inflexible, and so commonly such links also provide access to email facilities, a phone number by which they can contact a representative of the entity directly, thereby satisfying the requirement for flexible interaction found in their real-life counterparts.

Whilst jumping to new web pages or leaving the computer altogether to make a phone call may be an acceptable solution for a web environment, in a virtual 3D environment such as an on-line game world, users do not want to leave their current location in order to interact with a supervising entity; rather, they would prefer that this entity is represented directly within the virtual environment with them, as this is a natural form of interaction experienced in-real life.

However, for massively multiplayer online games where there may be tens of thousands of users (each represented on-line by an avatar, typically a human-like graphic character), all dispersed over many disparate areas of a game world possibly including multiple quasi-identical instances of virtual environments, providing such direct representation within the game would be prohibitively costly in terms of human resources.

BRIEF SUMMARY OF THE INVENTION

The present invention seeks to mitigate or alleviate the above problem.

A first aspect of the present invention provides an entertainment device comprising a display generator arranged to generate for display a representation of an on-line virtual environment corresponding to a first instance of a plurality of substantially similar on-line virtual environments and to generate for display within the representation of the on-line virtual environment an avatar controlled by the user of the entertainment device and one or more software-controlled avatars; and a data communications arrangement operable to transmit an alert signal in response to a predetermined action of the user of the entertainment device within the first instance of the on-line virtual environment, said signal serving to request interaction with a human operator, the data communications arrangement being further operable to receive a notification signal; the display generator being arranged to respond to the notification signal by changing the mode of a software controlled avatar to represent an additional user of another entertainment device in data communication with the entertainment device, wherein the additional user is an operator whose entertainment device has been switched to the same first instance of the on-line virtual environment as that of the entertainment device in response to the transmitted alert signal; and the data communications arrangement being arranged to exchange information between the user of the entertainment device and the operator within the same first instance of the on-line virtual environment via their respective avatars.

Advantageously, therefore, for example the user of an entertainment device typically located at the user's home and connected to an environment representing a comparatively small proportion of the total online population is nevertheless able to access one or more software controlled (automated) avatars at a time of their choosing, and have the avatar smoothly transfer control to a human operator in the event that the avatar is not equipped to respond appropriately to the user.

In a second aspect of the present invention, an entertainment device for interacting with an on-line virtual environment comprises a data communication arrangement operable to receive a signal indicating that a user of a second entertainment device in an instance of the on-line virtual environment has performed a predetermined action within that instance of the on-line virtual environment; a processor, responsive to the receipt of the signal, operable to transfer control of a previously software-controlled avatar existing within that instance of the on-line virtual environment to an operator of the entertainment device so that the previously software-controlled avatar then represents the operator of the entertainment device; and a display generator arranged to generate for display at least a representation of an avatar controlled by the user of the second entertainment device; the data communication arrangement being operable to allow the exchange information between the user of the entertainment device and the user of the second entertainment device within that instance of the on-line virtual environment via their respective avatars.

Advantageously, therefore, for example an operator using such an entertainment device in a call centre can successively interact with users from a plurality of separate instances of the on-line virtual environment without having to be present in any one of them for any length of time, by connecting to automated avatars within those instances of the on-line virtual environment that are continuously present.

In a third aspect of the present invention, there is provided a server arranged to administer an on-line environment, the server comprising a data communication arrangement operable to receive a signal from a first entertainment device in data communication with an instance of the on-line virtual environment, the signal indicating that a user of the first entertainment device has performed a predetermined action; and a processor operable to determine the availability of a second entertainment device; the data communication arrangement being operable, if the second entertainment device is available, to transmit a signal to the first entertainment device indicating that a software controlled avatar within that instance of the on-line virtual environment should change mode to represent a user of the second entertainment device; the processor being operable to transfer control of a previously software controlled avatar within that instance of the on-line virtual environment to the second entertainment device.

Advantageously, therefore, for example a server can facilitate the linking of a user within one instance of an on-line virtual environment with a call-centre operator, thereby avoiding the need to have one or more dedicated operators providing support and services for each instance of the on-line virtual environment.

In a fourth aspect of the present invention, there is provided an on-line system comprising first and second entertainment devices; an on-line server operable to maintain a plurality of substantially similar on-line virtual environments; the first entertainment device being connected to a first instance of the on-line virtual environment, and the second entertainment device being connected to a second instance of the on-line virtual environment; the first entertainment device being operable to transmit a signal to the on-line server in response to a predetermined action of the user of the first entertainment device within the first instance of on-line virtual environment, said signal serving to request interaction with a human operator; the on-line server being operable to receive the signal from the first entertainment device; the on-line server is operable to switch the second entertainment device from a second instance of the on-line virtual environment to the first instance of the on-line virtual environment; the on-line server being operable to transmit a notification signal to the first entertainment device indicating that a software controlled avatar should change mode to represent an additional user; and the on-line system being arranged to transfer control of the previously software controlled avatar within the first instance of the on-line virtual environment to the second entertainment device.

Advantageously, therefore, for example the use of such a system allows the implementation of parallel instances of an on-line virtual environment respectively populated by a comparatively small proportion of the total number of online users, who may be serviced and supported by a centrally accessed group of operators.

Methods of operation, as carried out in operation by the apparatus of the above aspects, provide corresponding advantages.

Further respective aspects and features of the invention are defined by the appended claims.

BRIEF DESCRIPTION OF THE DRAWINGS

Embodiments of the present invention will now be described by way of example with reference to the accompanying drawings, in which:

FIG. 6b is a schematic diagram of a lobby zone in accordance with an embodiment of the present invention;

FIG. 8b is schematic diagram of a trophy room zone in accordance with an embodiment of the present invention;

FIG. 9 is a schematic diagram of a communication menu in accordance with an embodiment of the present invention;

DETAILED DESCRIPTION

An apparatus and method of virtual interaction are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity in present invention embodiments.

In a summary embodiment of the present invention, a user of an entertainment device such as a Sony® PlayStation 3® entertainment device navigates within one of a large plurality of virtual 3D environments available from an on-line server, each populated by a comparatively small proportion of the total number of other users currently on-line. Within this interactive environment, these users are represented by human-like avatars, enabling social interaction between users. In addition to the other users, however, automated avatars occupy positions and roles within the environment, such as storekeepers or policemen. These avatars can provide basic automated responses to simple queries, but in the event that a query cannot be directly answered, the software running the environment on the PlayStation 3 (PS3) notifies the on-line server, which in turn selects and contacts a representative of the environment's supervising entity. The server provides a link that enables the representative to automatically switch to the specific instance of the environment in which the query or interaction is occurring, and furthermore to the automated avatar to which the query or interaction was addressed. The automated avatar thereby becomes that of the representative, enabling them to directly engage with the user and their query in a seamless fashion; indeed, the user need not necessarily know that a change from automated avatar to personal representative has occurred (or alternatively that the avatar was ever anything other than that of a personal representative). This enables a representative to seamlessly engage users via whichever automated avatar within the environment the user happened to choose, but without necessitating the continuous presence of one or more representatives within each game environment. The workings of the PS3, the virtual environment, and the method of interaction summarised above will now be described in more detail.

Figure 1:
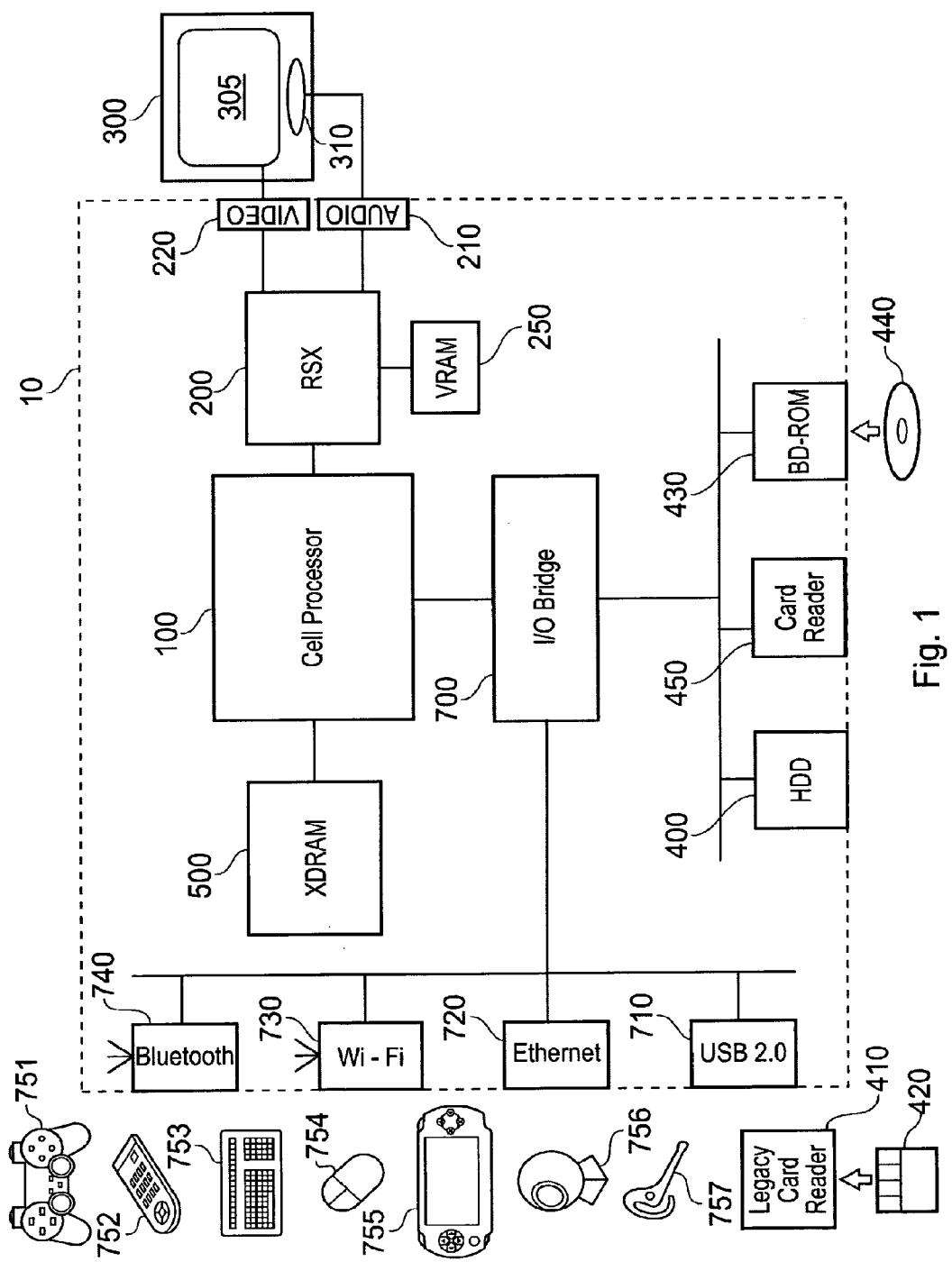
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to six Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi. communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In, general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
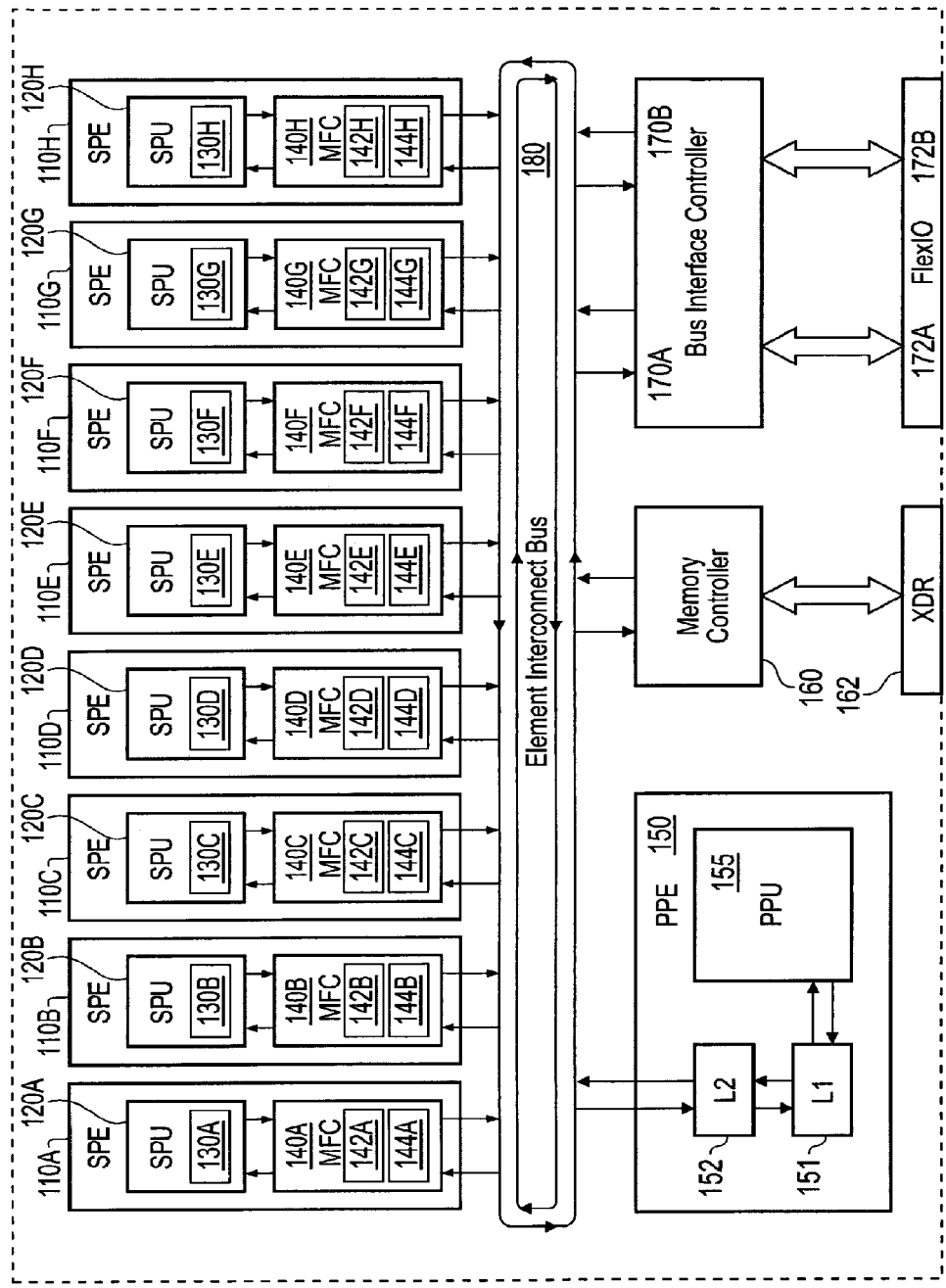
FIG. 2 is a schematic diagram of a cell processor.

Referring now to FIG. 2, the Cell processor 100 has an architecture comprising four basic components: external input and output structures comprising a memory controller 160 and a dual bus interface controller 170 A,B; a main processor referred to as the Power Processing Element 150; eight co-processors referred to as Synergistic Processing Elements (SPEs) 110 A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110 A-H, which handle most of the computational workload. In operation the PPE 150 maintains a job queue, scheduling jobs for the Synergistic Processing Elements 110 A-H and monitoring their progress. Consequently each Synergistic Processing Element 110 A-H runs a kernel whose role is to fetch a job, execute it and synchronise with the PPE 150.

Each Synergistic Processing Element (SPE) 110 A-H comprises a respective Synergistic Processing Unit (SPU) 120 A-H, and a respective Memory Flow Controller (MFC) 140 A-H comprising in turn a respective Dynamic Memory Access Controller (DMAC) 142 A-H, a respective Memory Management Unit (MMU) 144 A-H and a bus interface (not shown). Each SPU 120 A-H is a RISC processor clocked at 3.2 GHz and comprising 256 kB local RAM 130 A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120 A-H does not directly access the system memory XDRAM 500; the 64-bit addresses formed by the SPU 120 A-H are passed to the MFC 140 A-H which instructs its DMA controller 142 A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170 A,B and the 8 SPEs 110 A-H, totaling 12 participants. Participants can simultaneously read and write to the bus at a rate of 8 bytes per clock cycle. As noted previously, each SPE 110 A-H comprises a DMAC 142 A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170 A,B comprises a Rambus FlexIO® system interface 172 A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170 A and the Reality Simulator graphics unit 200 via controller 170 B.

Data sent by the Cell processor 100 to the Reality Simulator graphics unit 200 will typically comprise display lists, being a sequence of commands to draw vertices, apply textures to polygons, specify lighting conditions, and so on.

Figure 3:
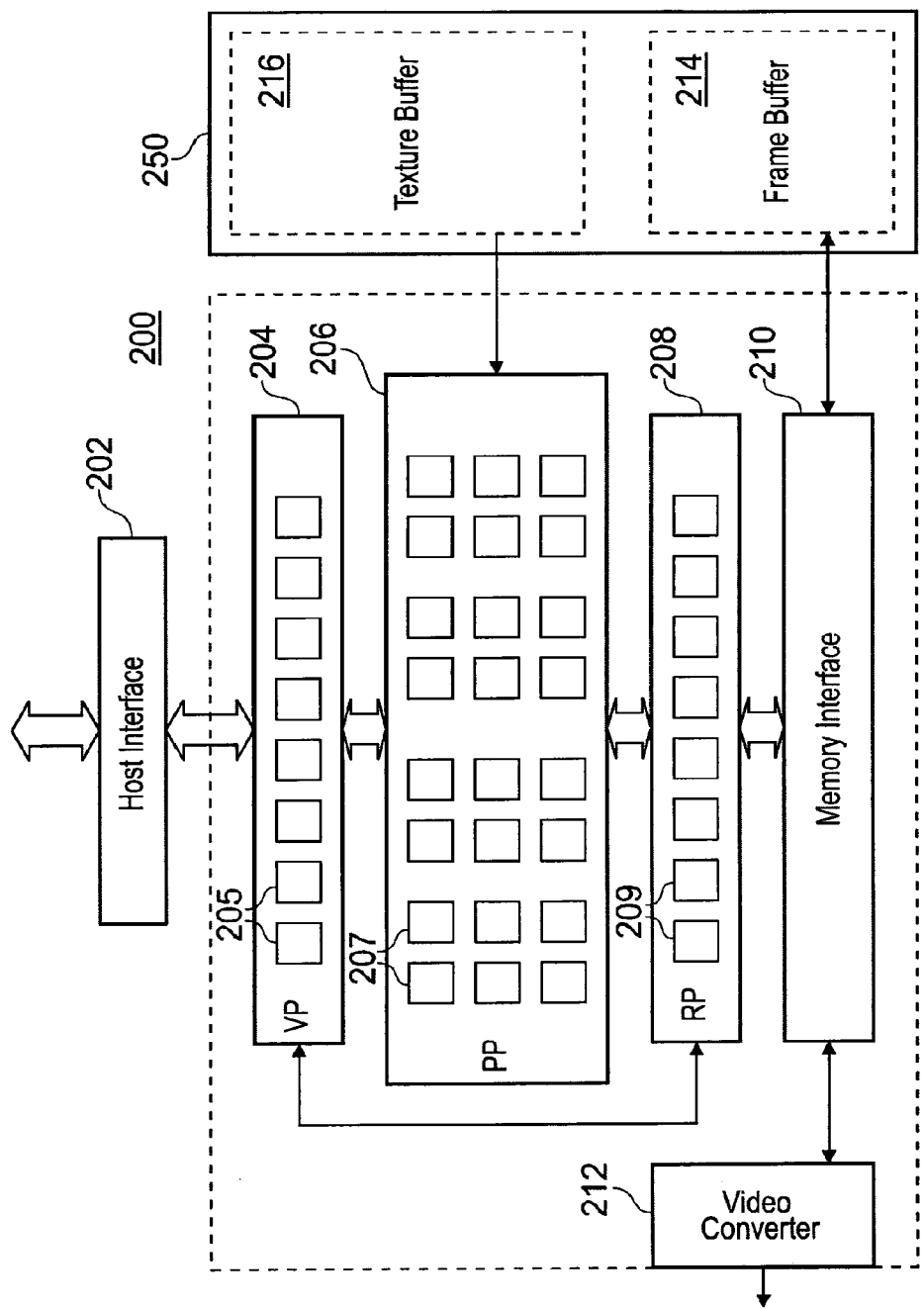
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170 B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110 A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170 B. The or each SPE 110 A-H outputs its computed particle properties (typically coordinates and normals, indicating position and attitude) directly to the video RAM 250; the DMA controller 142 A-H of the or each SPE 110 A-H addresses the video RAM 250 via the bus interface controller 170 B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the functions horizontally using a game controller 751, remote control 752 or other suitable control device so as to highlight the desired function, at which point options pertaining to that function appear as a vertically scrollable list centred on that function, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demos and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with a virtual environment populated by avatars (graphical representations) of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
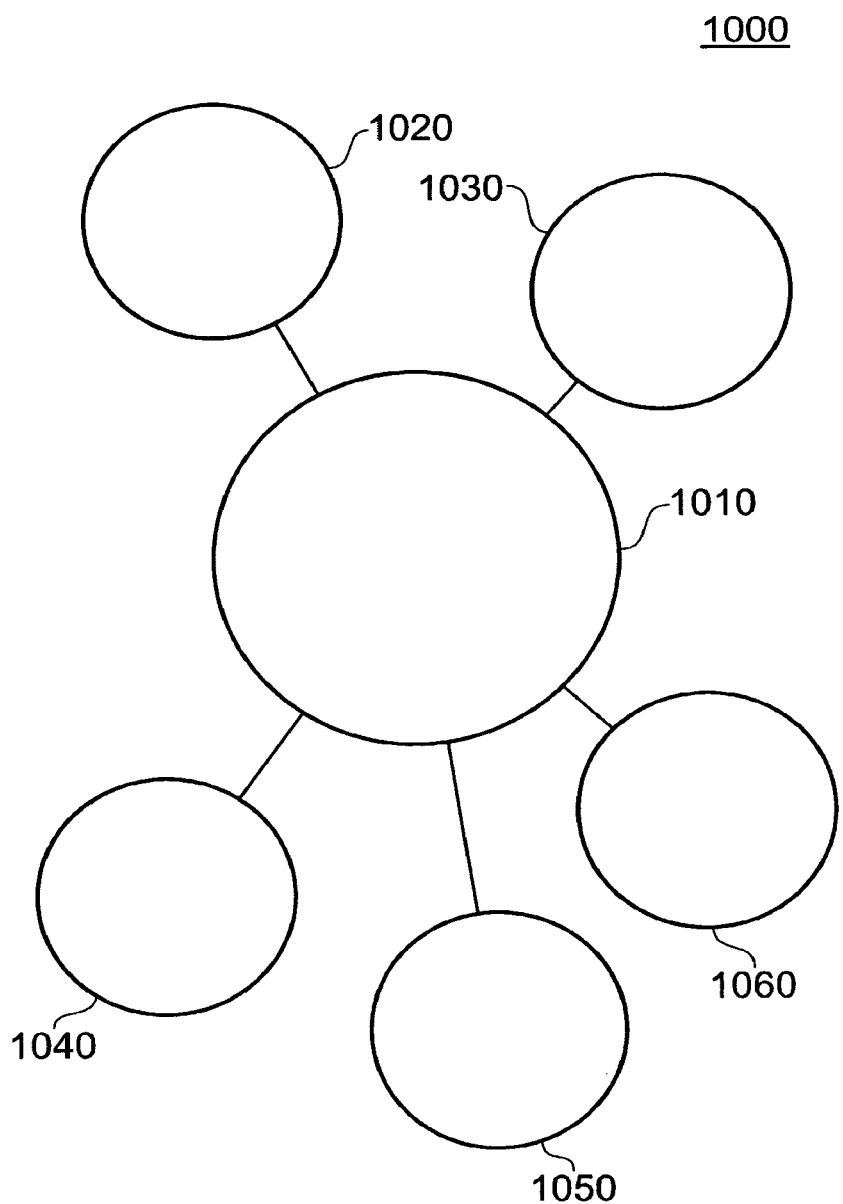
FIG. 4 is a schematic diagram of an interconnected set of game zones in accordance with an embodiment of the present invention.
Figure 5:
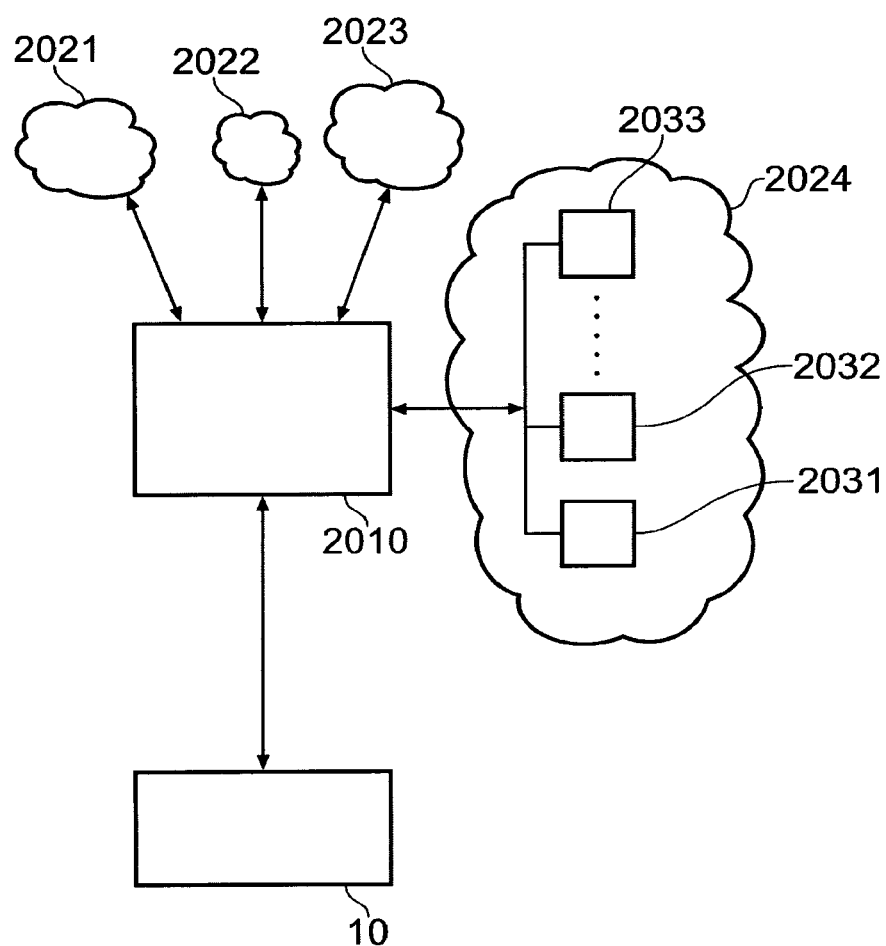
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the select zone to be loaded and the avatar to be spawned within that zone. In an embodiment of the present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there maybe many more zones available than are locally stored on the user's PS3 at any one time; the local availability may be colour coded on the list, or the list may be filtered to only display locally available zones. If the user selects a locally unavailable zone, it can be downloaded from a Home environment Server 2010.

Figure 6A:
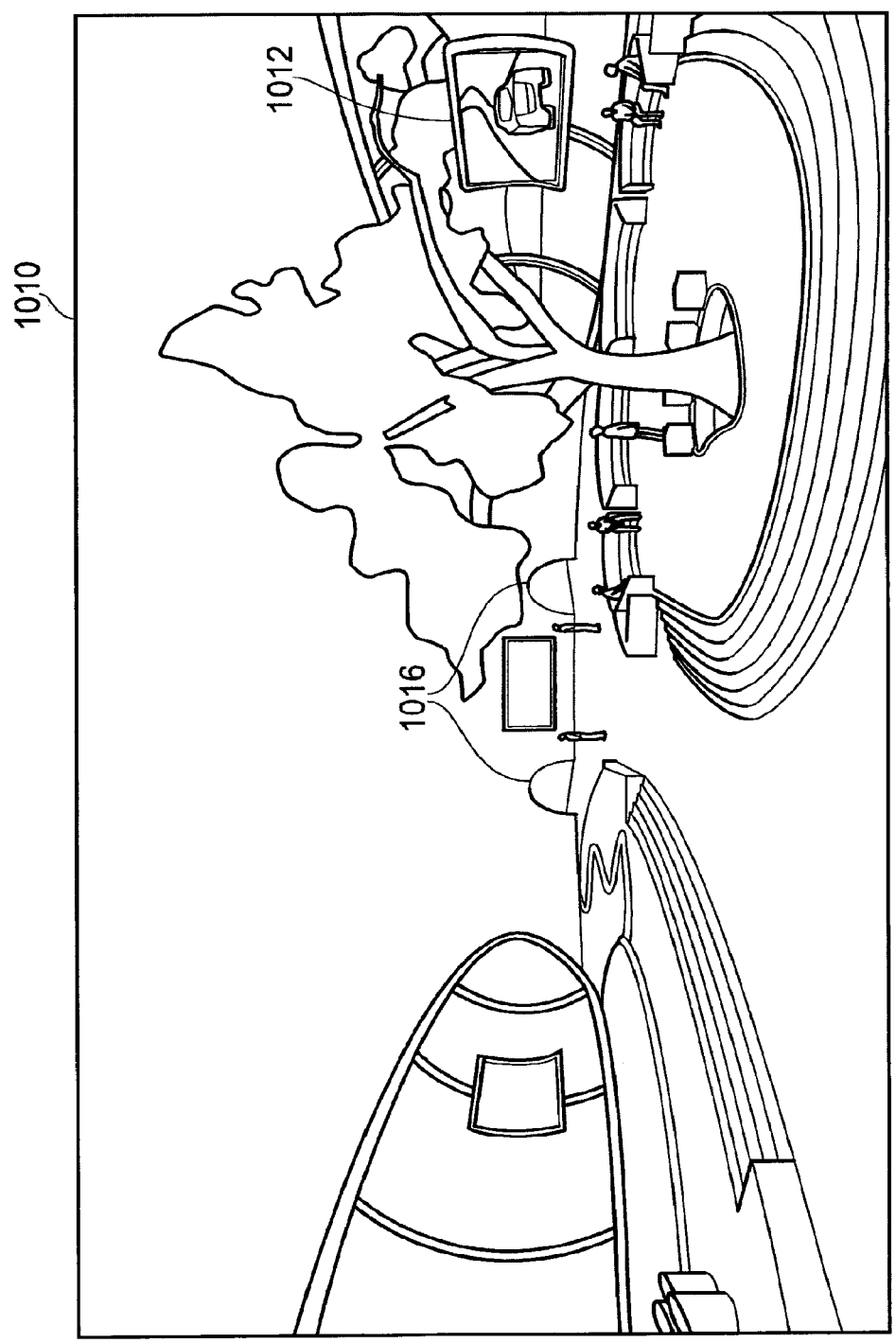
FIG. 6a is a schematic diagram of a lobby zone in accordance with an embodiment of the present invention.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Referring now also to FIG. 6b, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the home environment may switch to a substantially full-screen representation of the videogame selected; Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
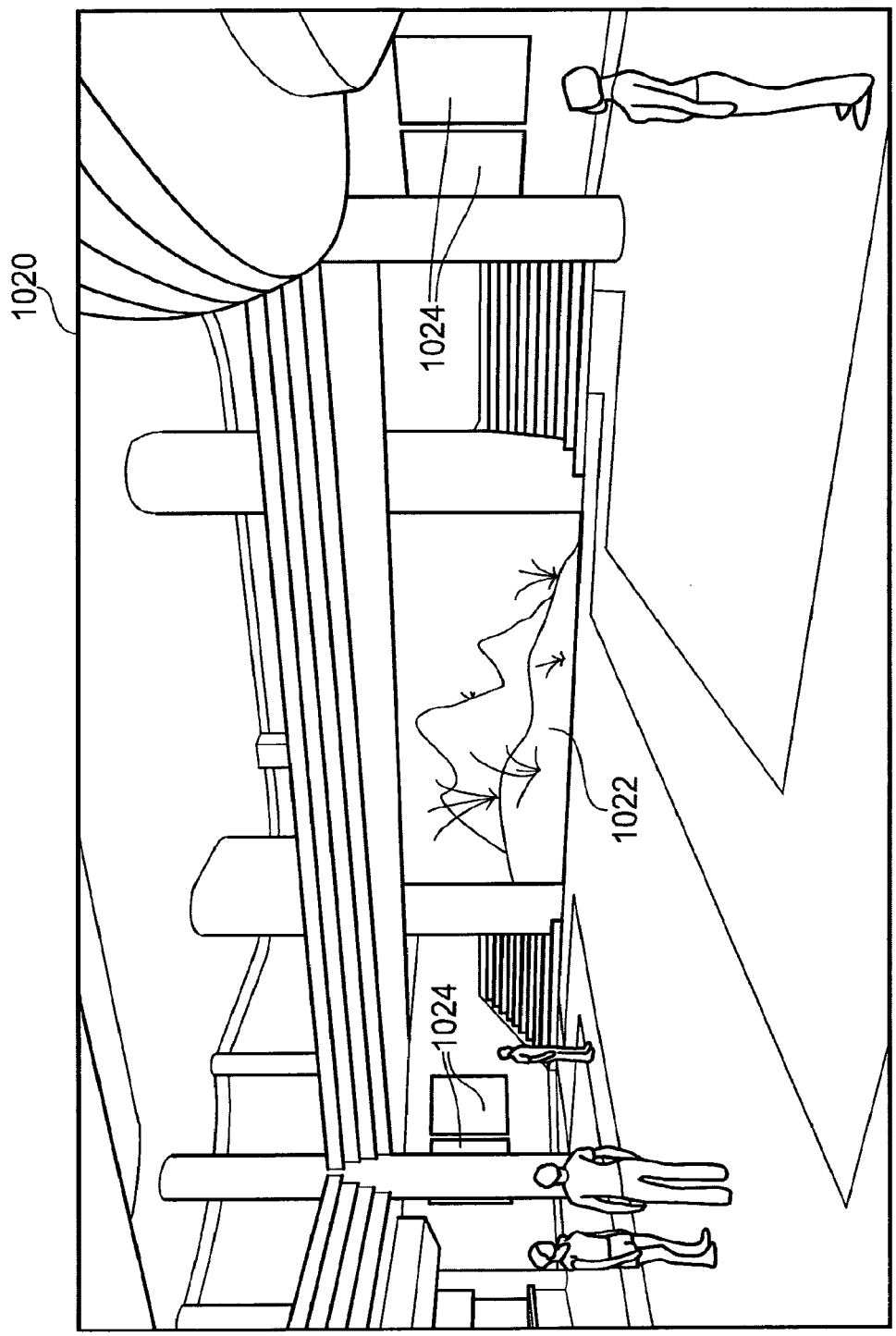
FIG. 6c is a schematic diagram of a cinema zone in accordance with an embodiment of the present invention.

Referring now also to FIG. 6c, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific-screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
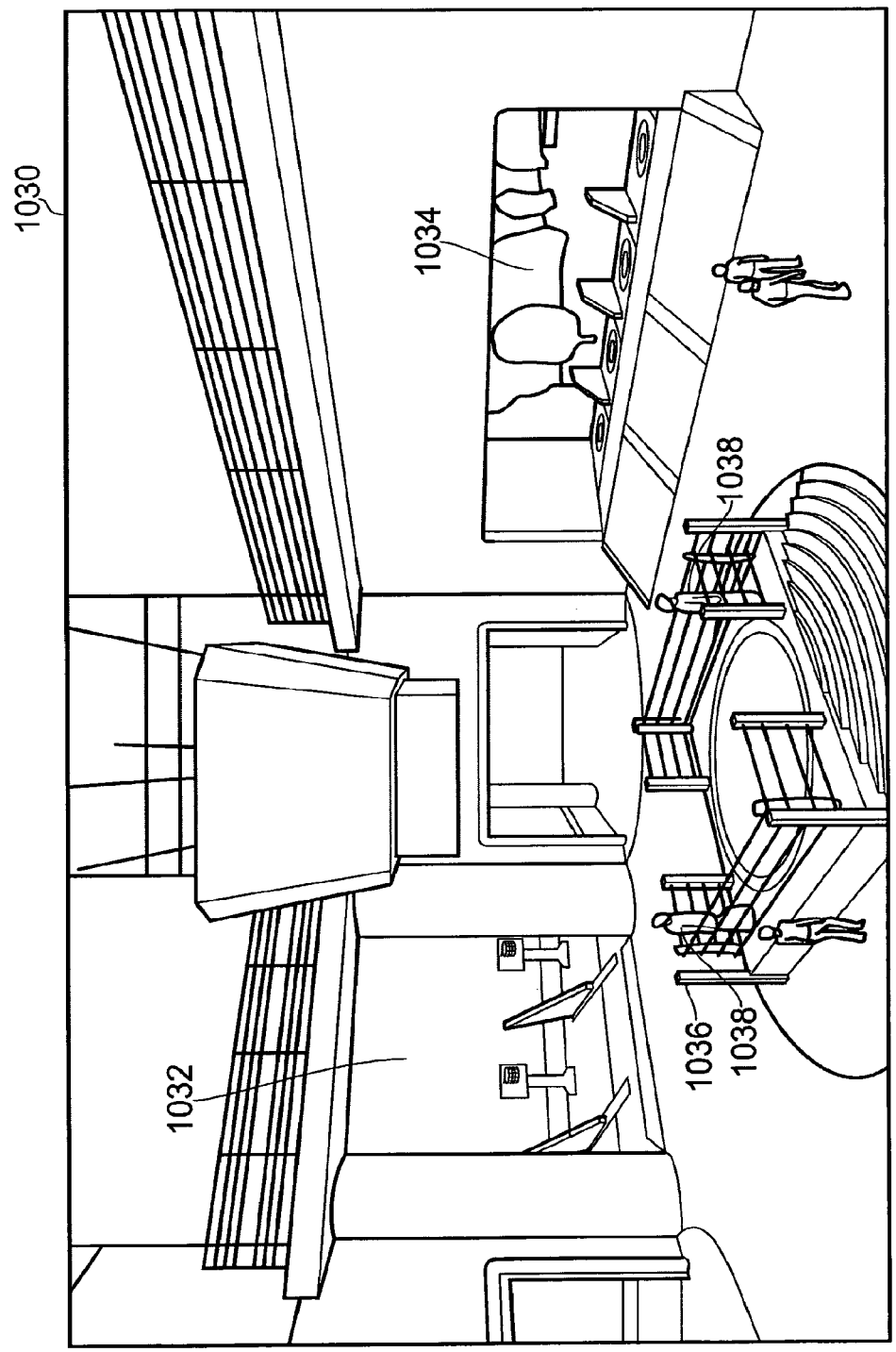
FIG. 6d is a schematic diagram of a developer/publisher zone in accordance with an embodiment of the present invention.

Referring now also to FIG. 6d, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks.

The developer or publisher zones 1030 are supplementary software modules to the Home environment and typically comprise additional 3D models and textures to provide the structure and appearance of the zone.

In addition, the software operable to implement the Home environment supports the integration of third party software via an application program interface (API). Therefore, developers can integrate their own functional content within the Home environment of their own zone. This may take the form of any or all of:
  i. Downloading/streaming of specific content, such as game trailers or celebrity endorsements;
  ii. Changes in avatar appearance, behaviour and/or communication options within the zone;
  iii. The provision of one or more games, such as basketball 1032 or a golf range 1034, optionally branded or graphically reminiscent of the developer's or publisher's games;
  iv. One or more interactive scenes or vignettes representative of the developer's or publisher's games, enabling the player to experience an aspect of the game, hone a specific skill of the game, or familiarise themselves with the controls of a game;
  v. An arena, ring, dojo, court or similar area 1036 in which remotely played games may be represented live by avatars 1038, for spectators to watch.

Thus, for example, a developer's zone resembles a concourse in the developer's signature colours and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, Commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an API (application program interface), to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS. Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
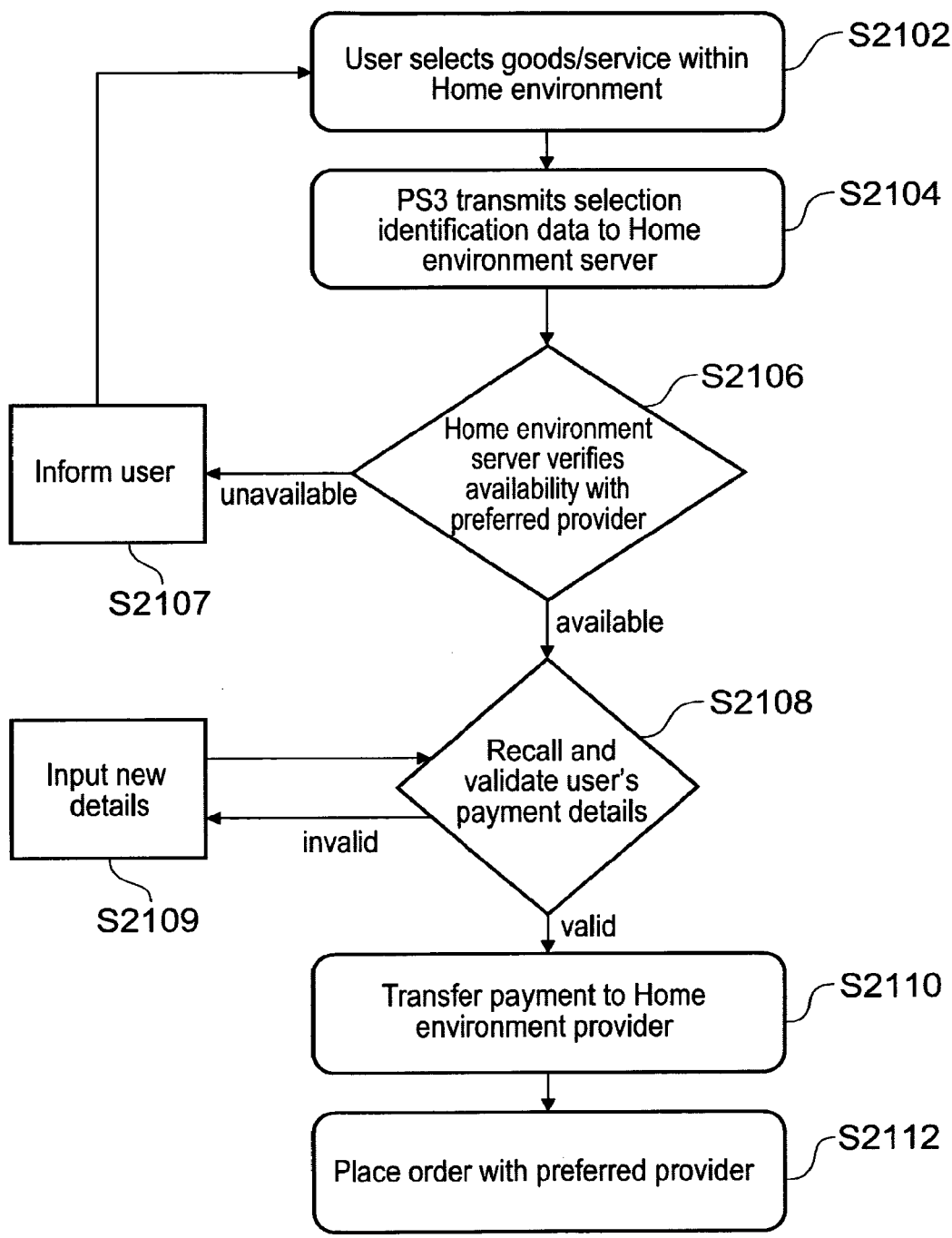
FIG. 7 is a flow diagram of a method of on-line transaction in accordance with an embodiment of the present invention.

Thus, referring now also to FIG. 7, in an embodiment of the present invention a method of sale comprises in a step s 2102 a user selecting an item (goods or a service) within the Home environment. In step s 2104, the PS3 10 transmits identification data corresponding with the object to the Home environment server 2010, which in step s 2016 verifies the item's availability from a preferred provider (preferably within the country corresponding to the IP address of the user). If the item is unavailable then in step s 2107 it informs the user by transmitting a message to the user's PS3 10. Alternatively, it first checks for availability from one or more secondary providers, and optionally confirms whether supply from one of these providers is acceptable to the user. In step s 2108, the Home environment server retrieves from data storage the user's registered payment details and validates them. If there is no valid payment method available, then the Home environment may request that the user enters new details via a secure (i.e. encrypted) connection. Once a valid payment method is available, then in step s 2110 the Home environment server requests from the appropriate third part payment provider a transfer of payment from the user's account. Finally, in s 2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Figure 8A:
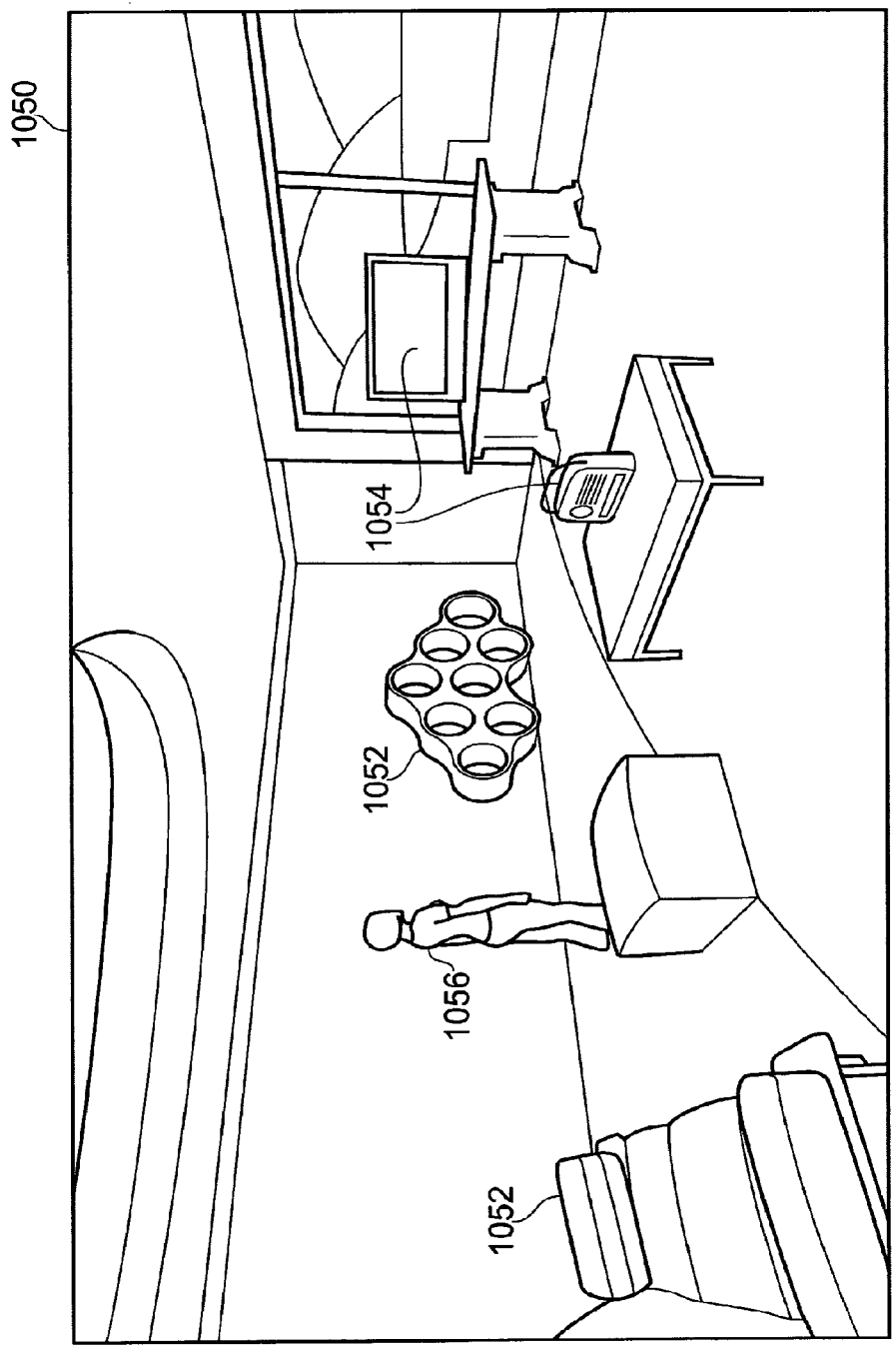
FIG. 8a is schematic diagram of an apartment zone in accordance with an embodiment of the present invention.

Referring to FIG. 8*a*, the first of these zones is an apartment zone 1050. In an embodiment of the present invention, this is a user-customisable zone in which such features 1052 as wallpaper, flooring, pictures, furniture, outside scenery and lighting may be selected and positioned. Some of the furniture is functional furniture 1054, linked to PS3 functionality. For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to internet radio streams. In addition, user artwork or photos may be imported into the room in the form of wall hangings and pictures.

Optionally, the user (represented in FIG. 8*a* by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorisation key to unlock the relevant item for use within the user's apartment. Alternatively, the 3D model, textures and any software associated with an item may also be downloaded from the Home environment server or an authorised third-party server, optionally again associated with an authorisation key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session.

Referring to FIG. 8*b*, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this as a trophy for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the user's trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best gamers within a geographical, age specific or game specific group, or even world wide. Alternatively or in addition, a leader board of the best scoring gamers can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customisation of a user's avatar from a selection of pre-set options in a similar manner to the customisation of the user's apartment. The user may select gender and skin tone, and customise the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the home server when joining a populated Home environment.

Each avatar in the home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment. Some avatar behaviour is contextual; thus for example the option to sit down will only be available when the avatar is close to a seat. Other avatar behaviour is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of a speech option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the present area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java® applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony® Eye Toy® video camera can use a video chat mode, for example via a pop-up screen, or via a TV or similar device within the Home environment, such as a Sony® Playstation Portable® (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate online Home environments. Likewise, there may be many separate Home environment servers, for example in different countries.

Once assigned to a Home environment, a PS3 initially uploads information regarding the appearance of the avatar, and then in an ongoing fashion provides to the Home environment server with positional data for its own avatar, and receives from the Home environment server the positional data of the other avatars within that online Home environment. In practice this positional update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement.

In addition the IP addresses of the other PS3s 2131, 2032, 2033 within that Home environment 2024 is shared so that they can transmit other data such as speech in a peer-to-peer fashion between themselves, thereby reducing the required bandwidth of data handled by the Home entertainment server.

To prevent overcrowding within the Home environments, each will support a maximum of, for example, 64 users.

The selection of a Home environment to which a user will be connected can take account of a number of factors, either supplied by the PS3 and/or known to the Home environment server via a registration process. These include but are not limited to:

i. The geographical location of the PS3;
ii. The user's preferred language;
iii. The user's age;

iv. Whether any users within the current user's 'friends list' are in a particular Home environment already;
v. What game disk is currently within the user's PS3;
vi. What games have recently been played on the user's PS3.

Thus, for example, a Swiss teenager may be connected to a Home environment on a Swiss server, with a maximum user age of 16 and a predominant language of French. In another example, a user with a copy of 'Revolution' mounted in their PS3 may be connected to a home environment where a predominant number of other users also currently have the same game mounted, thereby facilitating the organisation of multiplayer games. In this latter case, the PS3 10 detects the game loaded within the BD-Rom 430 and informs the Home environment server 2010. The server then chooses a Home environment accordingly.

In a further example, a user is connected to a Home environment in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is on-line. The user may then broadcast an invite to their friends, either using a peer-to-peer connection or, if the friend is within a Home environment or the IP address is unknown, via the Home environment server. The friend can then accept or decline, the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends are within the same Home environment, in an embodiment of the present invention the map screen may also highlight those zones in which the friends can currently be found, either by displaying their name on the map or in association with the zone name on the side bar.

Figure 10:
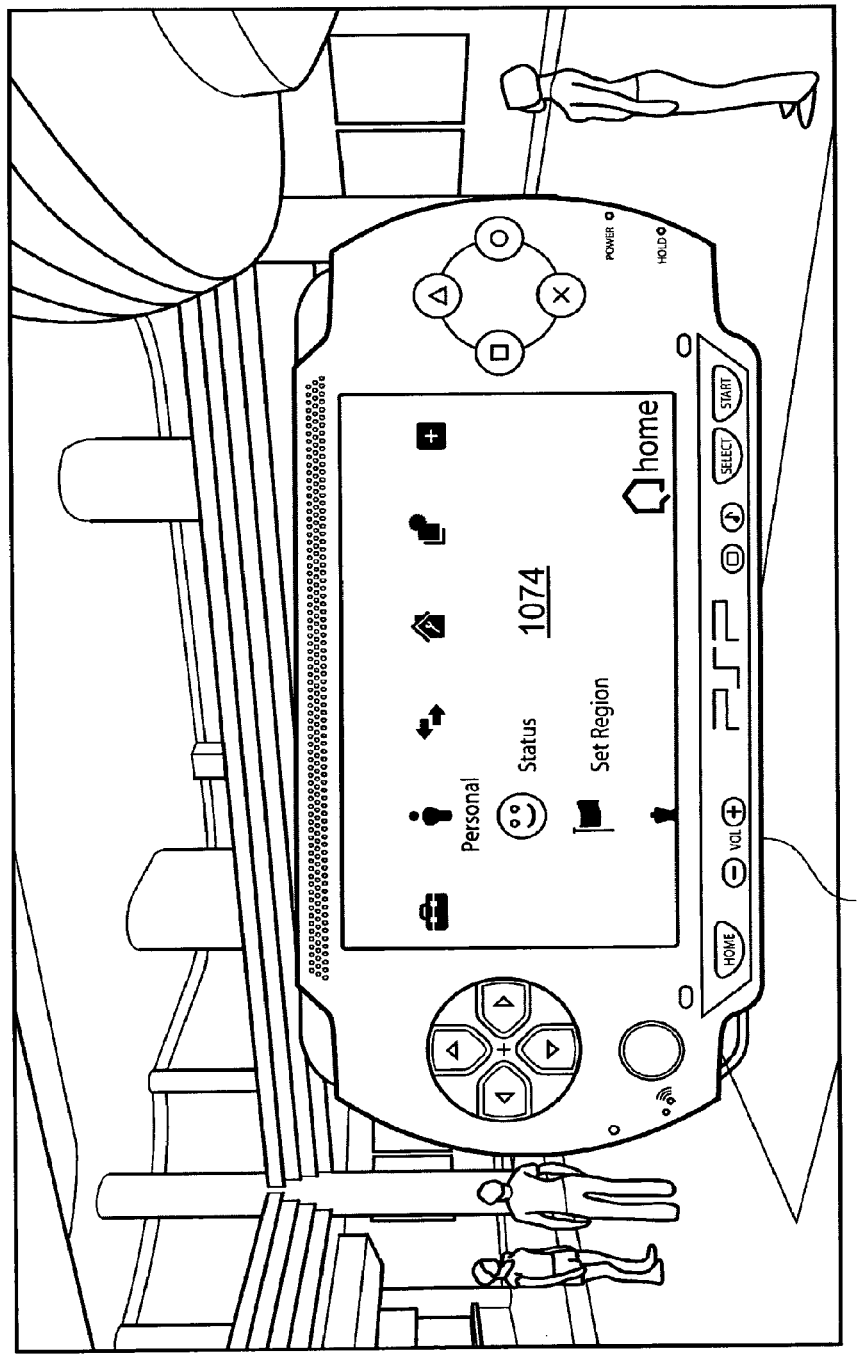
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony® Playstation Portable® (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so by selection of an appropriate key on the game controller 751, by selection of an exit option from a pop-up menu, by selection of an exit from within the map screen, by selection of an option via their virtual PSP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

Figure 11:
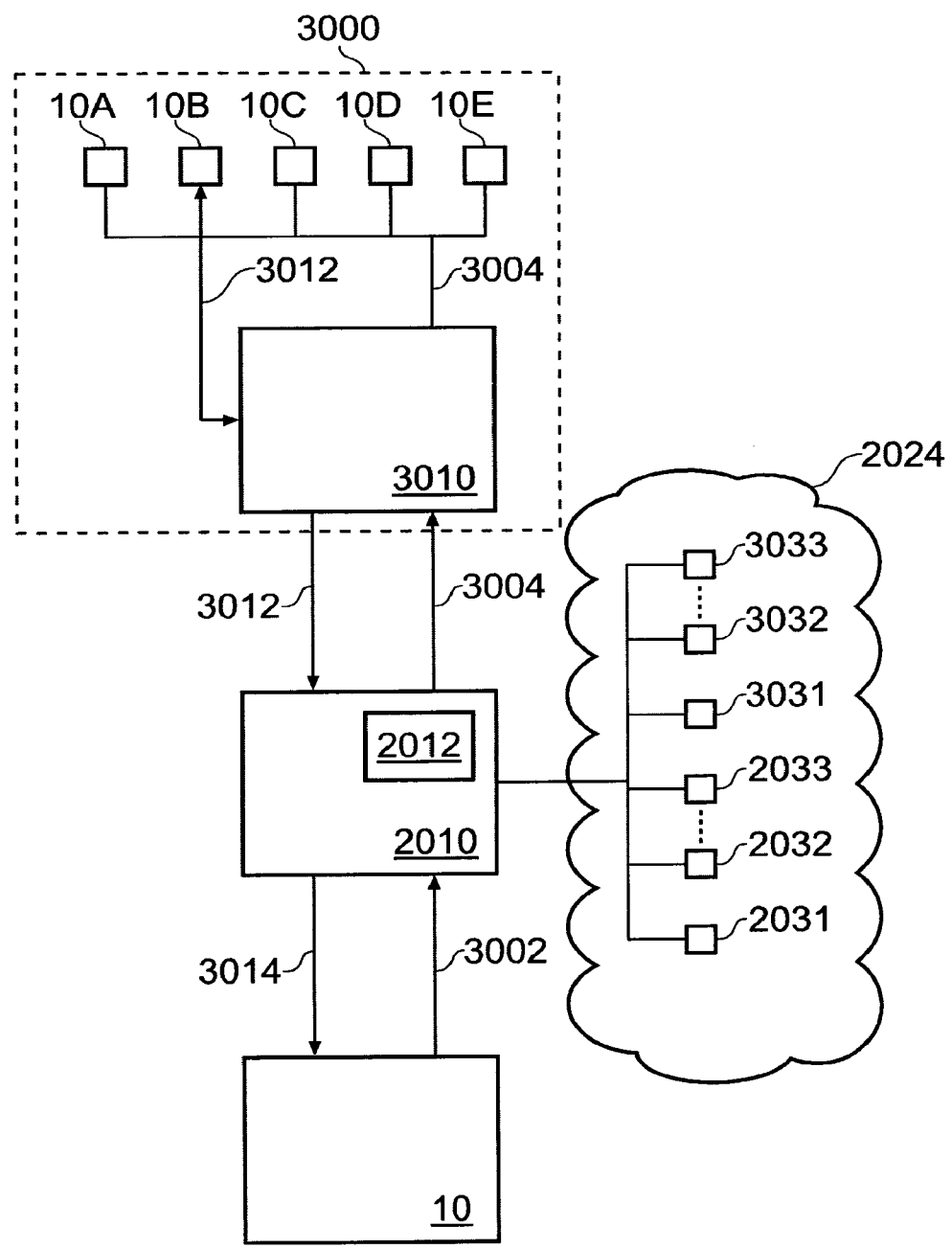
FIG. 11 is a schematic diagram of a Home environment system in accordance with an embodiment of the present invention.

FIG. 11 is a schematic diagram of a Home environment system in accordance with an embodiment of the present invention. Features in common with those of FIG. 5 are labelled the same. As described previously, a user's PS3 10 connects to a Home environment server 2010 which assigns the user to a particular instance of the Home environment 2024, in which can be found the avatars of other users 2031, 2032, 2033. The user of the PS3 then communicates with the other users via their avatars, the PS3 using a mixture of data shared via the Home environment server (such as positional data) and peer-to-peer data (such as text or speech communication).

In addition to user-driven avatars, one or more automated avatars 3031, 3032, 3033 are present within the Home environment, in one or more zones.

These automated avatars may signify different roles, and represent different entities.

For example, a zone such as the lobby may comprise automated avatars resembling a tour guide and a security guard. These avatars represent the providers of the Home environment and may be controlled by the Home environment server. Meanwhile, in a commercial zone each virtual shop may comprise one or more automated avatars resembling shop assistants, dressed in the respective uniform of the shop. Clearly these avatars will represent the owners of the shop. In an embodiment of the present invention, the Home environment server 2010 can generate positional information for such avatars and transmit it alongside that for the avatars of the other users. The positional information for such automated avatars could cause the automated avatars to stay generally in one place in the virtual environment, but to move around a little so as not to look unnaturally stiff. Alternatively, for example in a commercial zone, the automated shop assistant avatars could be caused to follow a user's avatar around the shop at a discrete distance.

Each type of avatar may be associated with a specific set of default communication options. Thus, if a user initiates a conversation with such an automated avatar, rather than the options provided for conversation between users as seen in FIG. 9 and as described previously, a communication menu will provide a predetermined set of questions for which the automated avatar has been programmed to respond.

For example, when interacting with the tour guide, in an embodiment of the present invention the top-level conversation options comprise 'Where is . . . ', 'When is . . . ', 'How do I . . . ', etc. Selection of one of these leads to an appropriate sub-menu. For example, 'Where is'>'the Cinema', 'the Bowling alley', 'friend X'. In response to the user's selection of one of these options from the sub-menu (thereby completing a question), the avatar will then answer—for example by pointing to the relevant exit, area or friend's avatar as applicable, or optionally guiding the user to the relevant exit, area or friend's avatar. The friends listed may be limited to those within the same instance of the Home environment, or may be a full list. In the latter case, the PS3 requests information from the Home environment server as to whether any of the listed friends are online within the Home environment or, if the information is available, within the online environment of another game. The avatar could then present this information and in the case of friends being within another Home environment, offer to "teleport" (transfer or move within the virtual world) the user over to that instance of the Home environment to join them.

Similarly, a 'When' question may be followed by options for scheduled events that day occurring in the lobby or in other zones (for example, films showing at the cinema). Such schedules and communication options may be downloaded to the user's PS3 from the Home environment server when initialising the Home environment, thereby providing up-to-date information that can be integrated into the responses of one or more relevant automated avatars.

When interacting with a shop assistant, similarly a set of associated predefined questions are available from the communication menu. In an embodiment of the present invention these comprise a cascade of item categories or a search query in which the user can type the name of a product or service. In this case the PS3 accesses the Home environment server, which in turn relays the query to a server run by or for the owners of the virtual shop. This server interrogates a database to determine the availability of the requested item, and returns a response that can be formatted by the user's PS3 as a reply by the avatar, in terms of text and/or a location within the shop in which the item is displayed, enabling the avatar to point to the object or guide the user to it.

In an embodiment of the present invention, where the item is available, the user can be offered the option to purchase it, using either software associated with the shop via the Home environment software's API, or using the Home environment's own method of sale as disclosed previously.

It will be appreciated in alternative embodiments, the PS3 contacts the server run by or for the shop directly. Alternatively, the Home environment server 2010 comprises a server for the shop itself.

However, situations will arise where the options available via such communications menus are insufficient to meet the user's needs, or the user wishes to communicate with the avatar via a more natural medium such as speech.

The software running the Home environment on the PS3 is equipped to send an alert or so-called 'distress' signal 3002 to the Home environment server 2010 when one or more events trigger it. The events may vary according to which automated avatar the user is interacting with or is near to, or where the user's avatar is within the Home environment.

For example, a specific communication menu option such as 'There is a problem in this lobby' may be available for interaction with the security guard. Selection of this option (or other options within a predefined set or subset of the available options) triggers the alert signal 3002. In another example, a user enters free text that the automated avatar is unable to recognise, causing the alert signal 3002 to be triggered. In a third example, proximity to an avatar, or entry into an area in which the avatar resides (such as a shop) causes the alert signal 3002 to be triggered. In a fourth example, the user attempts to initialise a conversation with the avatar using peer-to-peer voice transmission, triggering the alert signal 3002. It will be appreciated that not all software avatars may trigger alerts based upon the proximity of the user. Rather only a predetermined type or set of software controlled avatars (for example shop assistants) may have this alert trigger. Indeed, optionally some software controlled avatars may not be enabled in the fashion described herein at all, for example only serving to provide a sense of atmosphere within the Cinema environment.

The alert signal 3002 specifies the automated avatar with which the user is interacting, approaching or is closest to, depending on the triggering event as outlined above.

Optionally, the alert signal 3002 also comprises some or all of the preceding conversation between the user and the avatar.

Optionally, the alert signal 3002 also comprises the network address of the user's PS3.

The alert signal 3002 is transmitted from the user's PS3 to the Home environment server 2010. The Home environment server 2010 is periodically updated with the position of the user, as described previously, and originally assigned the user to the specific instance of the Home environment they are in. Thus in conjunction with the alert signal 3002, an alert signal determining means 2012 is operable to determine which avatar, in which instance of the many instances of the home environment, has sent the alert signal. This determined information is hereafter collectively termed the 'alert package' 3004. The alert package 3004 may optionally also include which PS3 (and hence which user) has triggered the alert, some or all of the preceding conversation between the user and the avatar, the IP (network) address of the user's PS3, and/or the approximate current position of the user and the automated avatar within the Home environment.

It will be appreciated that if there is only one automated avatar within the home environment, there is no need for the alert signal 3002 to specify the avatar. Similarly, the Home environment server may determine from positional data which automated avatar the user is interacting with, again removing the need for the alert signal 3002 to specify the avatar.

The Home Environment server 2010 forwards the alert package 3004 to an automatic alert package distributor (AAPD) 3010 located at a call centre 3000. The AAPD 3010 operates in analogous fashion to telephonic automatic call distributors (ACDs) used in call centres. The workings of the AAPD are described in more detail later.

The AAPD is connected to one or more PS3s 10 A . . . 10 E, of which only 5 are shown in FIG. 11 for purposes of clarity. Each PS3 is staffed by a call centre operator (and optionally a call centre operator staffs more than one PS3).

Figure 12:
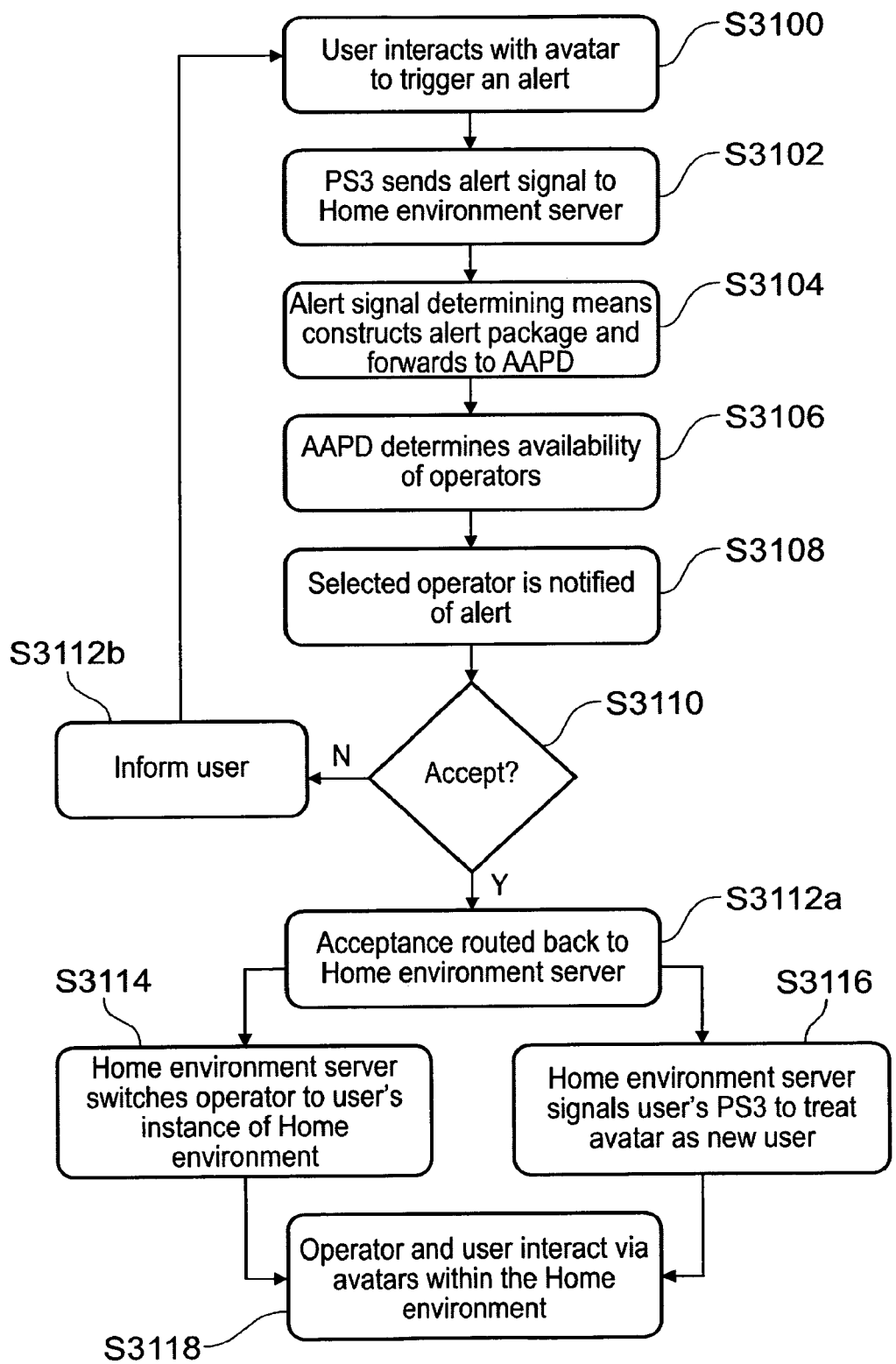
FIG. 12 is a flow diagram of a method of virtual interaction in accordance with an embodiment of the present invention.

Referring now to FIG. 12, in operation a first step s 3100 comprises the user performing an action within Home environment (such as interacting with an automated avatar in a specific way) that triggers an alert signal. In a step s 3102 the PS3 10 sends the alert signal 3002 to the Home environment server 2010. In a step s 3104, the alert signal determining means 2012 of the Home environment server 2010 assembles a corresponding alert package 3004 and sends it to the AAPD 3010. In a step s 3106, the AAPD scans for an available call centre operator (for example, that of PS3 10 B). Once an available call centre operator is found, the alert package is sent to their PS3.

The Home environment software on the call-centre PS3 is substantially similar to that of the Home environment software described herein for the user, but is further equipped to alert the call operator to the receipt of an alert package routed to it by the AAPD 3010. Thus in a step s 3108 the call-centre Home environment software on the call operator's PS3 alerts the operator to the presence of an alert package, and to the type of avatar (and thus the role that operator will adopt upon acceptance of the alert). If available, it also provides an on-screen summary of the conversation so far between the user and the automated avatar to inform the operator. It will be appreciated that optionally the user and operator both use substantially the same software, with the operator functions being withheld from normal users.

As noted previously, in principle the Home environment server 2010 can determine the relevant avatar directly from positional data. Consequently the type of avatar is also optional within the alert package for the purposes of connecting the operator, but is preferred where more than one possible avatar is available in order to inform the operator of their role.

If, in a step 3110, the operator accepts the alert package, then at a step 3112a, a message 3012 is sent from their PS3 via the AAPD to the Home environment server 2010, which at step 3016 switches them to the same specific instance of the Home environment as the current user. Since the Home environment is substantially the same, there is little or no need to load any additional data onto the call centre PS3, allowing for a rapid switch. Positional data for users other than the user who made the query are not critical and can be obtained on the next periodic update (typically within 2 seconds, as noted previously). In addition, the Home environment server sends a notification signal 3014 to the user's PS3 notifying it of the change of status of the automated avatar to being that of another user joining the user's instance of the Home environment.

Preferably, the positions of automated avatars are by default controlled by software on the Home environment server, so that all users within the Home environment see a consistent representation of these avatars. Therefore the switch of source for the positional data from server control to control by the operator will occur at the Home environment server. However, the use of automated communication options for the automated avatar is typically local to software on the user's PS3. Consequently the notification signal informs the user's PS3 to change communication options for the avatar in order to treat it like that of any other human user. In the event that the position of the automated avatar is controlled by the user's PS3, a switch to source positional data from the operator can also be signified by the notification signal.

The call centre operator's PS3 then relays to the Home environment server the operator's inputs to control the previously software-controlled avatar in a conventional manner as described herein.

In a step s 3118, the call operator and the user are then able to communicate like any other pair of users via their avatars through communication menus, free text or voice, as applicable, or alternatively or in addition by walking through the environment, with the operator either guiding the user to a specific location, or following the user to where there is a problem (e.g. between abusive users).

From the user's perspective, the avatar has been present throughout their session within the Home environment, and when they approached this avatar and made some query, the avatar responded as another person acting as the representative of the Home environment, shop, or whatever organisation the avatar corresponds to.

If the operator decides not to accept the alert (for example, the preceding conversation does not suggest this is a genuine query, or a user has triggered the same avatar a large number of times without good cause), then a rebuff signal may be routed back to the user via the Home environment server 2010. Such a rebuff signal may trigger a predefined response such as 'I'm sorry, I can't help you' or may contain a message typed or selected by the operator themselves.

It will be appreciated that optionally the operator does not perform the acceptance step s 3110, and instead is automatically switched to the relevant automated avatar depending on their availability.

It will be appreciated that in embodiments of the present invention, some or all of the messages between the call centre operator and the user may be sent either via the Home environment server 2010, bypassing the AAPD 3010 via a link to the Home environment server 2010 similar to the link between the user's PS3 10 and the server 2010, or may be via a peer-to-peer connection.

In an embodiment of the present invention, call centre operators also have access to web or network interfaces with the ordering systems of shops and service providers represented by automated avatars within the Home environment, enabling them to take orders for goods and services from users, on behalf of these shops and service providers. Typically this access will be via a separate computer terminal, in a conventional fashion.

In some cases, it may be desired that more than one operator respond to a user; for example when a user enters a virtual shop, all avatars may send alert signals. Optionally, the home environment server can select only to forward the alert signal corresponding to the automated avatar closest to the user's avatar or alternatively alert packages for each can be forwarded to the AAPD. This may be particularly useful if the user is using speech, as each operator who accepts the alert can then hear and talk to the user, allowing a quick determination of who is best suited to help the user. The other operators can then disconnect from their respective avatars.

When an operator disconnects from an avatar, the Home environment server sends a message to the user's PS3 to switch the relevant avatar back to an automated avatar mode.

The AAPD 3010 operates in an analogous fashion to a conventional ACD with regards to known queuing strategies such as i. First in, first out; the alert package which has been waiting longest is answered next.
ii. Last in, first out; the alert package which has been waiting the least is answered next
iii. Neutral share; alert packages are randomly selected Each of the above may be subject to a cut-off duration, or to a period of time after which an over-rule forces selection of an alert package.

In addition, skill-set queuing may be employed, wherein the availability of operators with respect to the next call is weighted according to their anticipated ability to handle the call. In an embodiment of the present invention, the assignment of alert packages to available operators is responsive to whether the operator's PS3 has the same zone of the Home environment loaded as that of the user (even if this zone is within another instance of the environment), as this will reduce switching time. In practice, the distribution of zones loaded by default at the call centre can be empirically determined to match the distribution of queries emanating from their user-based counterparts. Likewise available operators may be treated as sub-groups, e.g. by language.

In an embodiment of the present invention, to increase the speed and flexibility with which an operator can switch to an automated avatar, the Home environment software implemented by the operator's PS3 need not load the relevant zone into memory prior to switching operator control to the relevant automated avatar. In this case, the operator sees an empty environment and only the user's avatar and the avatar they have assumed control of. This will be sufficient for many interactions. Where either avatar moves beyond a certain distance, or where the operator anticipates the need to move within the relevant zone and presses a button on the controller 751, or simply after a short delay, the relevant zone can be loaded as a background operation, in similar fashion to when a user walks between zones within a tunnel or anteroom as described previously. Once loaded on the operator's PS3, the correct placement of the user and the operator within the zone can be displayed to the operator, allowing them to guide the user or be led by them. Thus in this embodiment it is only at this point that the operator would need to be switched into the user's specific instance of the Home environment.

Optionally, the operator may only be presented with a text interface, or an audio connection, by which to communicate with the user. However the operator will be unable to interpret gestures or movements of the user's avatar unless it is represented on the display as seen by the operator.

To further mitigate any delays during the process of assigning an operator to the automated avatar, the automated avatar can provide an appropriate holding message, such as 'Let me think . . . ' or 'I'll just fetch my microphone', designed to buy time while until a call centre operator accepts the alert package. Such messages can be triggered by a timer within the user's PS3, and/or can be triggered by a signal from the Home environment server 2010 in the event that there is a long queue. Optionally the automated avatar can clearly state that it is trying to connect the user to an operator, and that the user is $N^{th}$ in the queue, or can expect to wait M seconds. A countdown timer or a graphical indication such as a "fuel gauge" can be provided to show when the user's enquiry is likely to be addressed.

It will be appreciated that the operator's PS3 is less constrained by considerations of space on HDD 400 as the machine is not used for other games. Therefore a large number of zones (preferably all) may be stored on operator PS3s. Again, this can tend to reduce switching times and can ensure that the operator can view the relevant zone quickly.

The call centre may track which avatars are being used and which interactions result in successful sales, etc., for billing purposes to third parties.

In another embodiment of the present invention, the switch of status of the avatar from an automated avatar to that of another user is only broadcast from the Home environment server 2010 to the relevant user. In this case, the Home environment server 2010 continues to provide automated positional data for the avatar for other users within that instance of the Home environment, so that the automated avatar remains available for other users to access, firstly via automated responses supplied by their own PS3 software as described previously, and then by the transmission of their own respective alert signals (which would generally be answered by other call centre operators, i.e. different to the operator handling the enquiry from the first user).

This enables the user to hold a conversation with the operator in private, thereby not, for example, making a phone or credit card number publicly visible. Optionally, communications data between the user and the operator can be encrypted.

In an embodiment of the present invention, the call centre itself is a virtual call centre, comprised of operators equipped with PS3s at home, much like the users they service.

In an embodiment of the present invention, the AAPD 3010 is incorporated within the Home environment server 2010.

Conversely, in an embodiment of the present invention an AAPD 3010 comprises some Home environment server functions, specifically but not limited to the ability to directly receive an alert from a user's PS3, determine the availability of operators, transmit a notification signal back to the users PS3 and cause the operator to be switched to the user's instance of the Home environment, for example by sending messages to the operator's PS3 and/or Home environment server.

In a further embodiment of the present invention some Home environment server functions and AAPD functions are distributed between the PS3s of the user and the operator. A user's PS3 obtains a master list of network addresses for the PS3s of operators. Typically this master list is downloaded when the Home environment server initialises communications with the user's PS3, thereby providing a list of operators who are currently available. Then, referring again to FIG. 12, in the step 3102 the PS3 sends an alert signal to each operator on the list, or at least to one or more operators on the list, rather than to the Home environment server. Each operator's PS3 determines whether to respond (e.g. whether its operator is currently interacting with someone else) and if so, sends an acknowledgement back. The user's PS3 can then select the operator with the shortest response time (or some other criterion, such as lowest bit error rate) to send an alert package to. The operator's PS3 then notifies the operator. If the operator accepts, then the operator's PS3 sends the notification signal back to the user's PS3 as in step s 3116. In this way, the involvement of the Home environment server and an AAPD in connecting an operator to a software controlled avatar is avoided, with the steps of FIG. 12 being analogously performed by the user's and operator's PS3s.

It will be understood that variations in the above embodiment are envisaged. For example, the alert signal may simply be a ping to determine connection speed. Alternatively or in addition, the operators' PS3s can inform each other of their current status (either periodically or in response to an alert), and determine between them which PS3 or PS3s should respond to an alert, thereby placing the determination step s 3106 with the operators' PS3s. Again, the operators PS3 may not implement the step s 3110. Again as described above, the operator may not need to switch to the user's instance of the Home environment unless the user begins to move around beyond a certain distance, instead seeing an otherwise empty or neutral environment comprising the user's avatar and the previously software-controlled avatar that they are currently using to communicate with the user.

It will be appreciated that in embodiments of the present invention, elements of the method of virtual interaction may be implemented on the user's entertainment device, Home environment server, AAPD and operator's entertainment device in any suitable manner, including that the Home environment server and AAPD are a single unit, and that the user's and operator's entertainment devices may comprise similar hardware. Adapting these devices to carry out the method described herein may therefore comprise reprogramming one or more processors therein. As such the required adaptation may be augmented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet connection, a wireless network, the Internet or an combination of these or other networks.

It will be appreciated that the term "entertainment device" can encompass various types of data processing apparatus, not just dedicated games machines.

It will also be appreciated that apparatus features of the claimed devices (such as a display generator, a detector, a data communications arrangement and the like) can be implemented by programmable and other logic forming part of the PS3, under appropriate software and/or OS control.

The invention claimed is:

1. A method of operation of a server, the method comprising the steps of:
   receiving a signal from a first entertainment device indicating that a user of the first entertainment device in data communication with a first one of a plurality of substantially similar instances of an on-line virtual environment has performed a predetermined action;
   determining, by the one or more processors, the availability of a second entertainment device, and if that device is available:
   switching the second entertainment device from a second instance of the plurality of substantially similar instances of the on-line virtual environment to the first instance of the on-line virtual environment, in response to the received signal from the first entertainment device;
   transmitting a signal to the first entertainment device indicating that one or more software controlled avatars should change mode to represent one or more additional users; and
   transferring, by the one or more processors, control of a previously software controlled avatar within the first instance of the on-line virtual environment to the second entertainment device.

2. A method according to claim 1 comprising the step of maintaining a plurality of substantially similar on-line virtual environments.

3. A method according to claim 1, in which the step of determining the availability of the second entertainment device comprises determining the availability of entertainment devices within a specified group of entertainment devices and selecting an available entertainment device as the second entertainment device.

4. A method according to claim 1, in which the step of determining the availability of the second entertainment device comprises determining the availability of entertainment devices within a specified group of entertainment devices responsive to whether each entertainment device within the specified group of entertainment devices currently has a portion of the on-line virtual environment loaded within its memory that corresponds to the portion of the on-line virtual environment loaded within the memory of the first entertainment device.

5. A method according to claim 1, comprising the step of determining any or all of:
   i. to which instance of the first and second instances of the on-line virtual environment the user of the first entertainment device is connected;
   ii. the positions of the software controlled avatar and the user's avatar within their respective instance of the on-line virtual environment;
   iii. the identity of the software controlled avatar which the user is interacting with or is near to.

6. A method according to claim 1, comprising the step of receiving from the first entertainment device data identifying goods or services represented within the on-line virtual environment that have been selected by the user of the first entertainment device, and to verify the goods' or service's availability from a provider of the goods or services.

7. A method according to claim 6, comprising the step of retrieving from a data storage area registered payment details of the user of the first entertainment device, and validating them.

8. A method according to claim 6, comprising the step of placing an order to purchase the goods or service with the provider, giving the user's delivery address or network address as applicable, and transferring appropriate payment to the provider.

9. A method according to claim 1 comprising the step of using a software controlled avatar existing within the first instance of the on-line virtual environment as an interface with the user.

10. A method of on-line interaction comprising the steps of:
    maintaining a plurality of substantially similar instances of an on-line virtual environments;
    connecting a first entertainment device to a first one of the plurality of substantially similar instances of the on-line virtual environment, and connecting a second entertainment device to a second one of the plurality of substantially similar instances of the on-line virtual environment;
    transmitting an alert signal from the first entertainment device to an on-line server in response to a predetermined action of a user of the first entertainment device within the first instance of on-line virtual environment, the signal serving to request interaction with a human operator;
    receiving the alert signal from the first entertainment device at the on-line server;
    switching the second entertainment device from a second instance of the on-line virtual environment to the first instance of the on-line virtual environment, in response to the received alert signal from the first entertainment device;
    transmitting a signal from the on-line server to the first entertainment device indicating that a software controlled avatar should change mode to represent an additional user; and
    transferring, by one or more processors, control of the previously software controlled avatar within the first instance of the on-line virtual environment to the second entertainment device.

11. A method of on-line interaction according to claim 10, comprising the step of determining the availability of the second entertainment device in response to the receipt of the alert signal at the server.

* * * * *